US006760130B1

(12) United States Patent
Asai

(10) Patent No.: US 6,760,130 B1
(45) Date of Patent: Jul. 6, 2004

(54) IMAGE SCANNING APPARATUS

(75) Inventor: Shinji Asai, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 662 days.

(21) Appl. No.: 09/704,020

(22) Filed: Nov. 1, 2000

(30) Foreign Application Priority Data

Nov. 2, 1999 (JP) .......................................... 11-311829

(51) Int. Cl.⁷ .............................................. H04N 1/04
(52) U.S. Cl. ........................ 358/474; 358/496; 358/497; 358/498
(58) Field of Search ................................. 358/474, 496, 358/497, 498, 505, 509, 494

(56) References Cited

U.S. PATENT DOCUMENTS 6,384,940 B1 * 5/2002 Kawai et al. ................ 358/474

FOREIGN PATENT DOCUMENTS

| JP | 59-66240 | | 5/1984 | |
| JP | 5966240 | * | 5/1984 | ........... G03B/27/50 |

* cited by examiner

*Primary Examiner*—Kimberly Williams
*Assistant Examiner*—Negussie Worku
(74) *Attorney, Agent, or Firm*—Hogan & Hartson, LLP

(57) ABSTRACT

A harness extends inside a scanner frame to feed electricity to a lamp attached to a full rate carriage of a scanner. A light is emitted from the lamp to a document placed on a platen glass. The light reflected by the document is further reflected by mirrors attached to the scanner inside the scanner frame and introduced to CCD. Thus, an optical path of the light is formed inside the scanner frame. A harness guide is attached to a half rate carriage of the scanner to support and guide the harness in a way not to obstruct the optical path of the light. The harness guide is made from plastic to prevent high voltage flowing in the harness from leaking to the half rate carriage.

20 Claims, 6 Drawing Sheets

IMAGE SCANNING APPARATUS

BACKGROUND OF THE INVENTION

1. Field of the Invention

The present invention generally relates to an image scanning apparatus having a full rate carriage with a lamp (light source), and more particularly to an improvement on a harness extending to the lamp from a power supply in such image scanning apparatus.

2. Description of the Related Art

An image scanning apparatus that is combined with an image forming apparatus such as facsimile machines and photocopiers has a scanner adapted to move below a platen (glass), on which a document to be scanned is placed. The scanner can move in a sub-scanning direction. The scanner generally includes a full rate carriage having a lamp and first mirror, and a half rate carriage having second and third mirrors. The half rate carriage follows the full rate carriage at a half speed of the full rate carriage. The lamp is a light source which radiates the document on the platen. The light from the lamp is reflected by the document, and the reflected light is collected to a photoelectric converter such as CCD by the first to third mirrors and lens to transform a light signal to an electric signal. CCD then outputs an image signal (digital signal). This digital signal is used as a facsimile transmission signal. In case of photocopier, this digital signal is sent to a write means in an image recording unit to write a photo-image on a photosensitive body.

In order to feed electricity to the lamp on the full rate carriage, a harness extends to the full rate carriage from a power supply attached to a machine frame, which houses substantially all elements of the image scanning apparatus. High voltage is supplied to the lamp through the harness. In the conventional arrangement, the harness extends outside a scanner frame, which houses or supports the scanner, such that it does not become an obstacle to the two carriages moving below the platen. Referring to FIG. 7 of the accompanying drawings, schematically illustrated is relationship between a scanner 10, harness 25 and machine frame 2 in a plan view. A space 40 should be cleared in a rear area of the machine frame 2 behind a scanner frame 44 in the main scanning direction to accommodate the harness 25. This space 40 makes the machine frame depth (or thickness) large and in turn the machine size large.

SUMMARY OF THE INVENTION

An object of the present invention is to cause a lamp harness to extend in a way not to obstruct a light path of a scanner while making a machine depth small.

According to one aspect of the present invention, there is provided an image scanning apparatus having a platen glass on which a document to be scanned is loaded, a scanner which includes a full rate carriage movably located below the platen glass, a light source (lamp) mounted on the full rate carriage for emitting a light to the document on the platen glass, a half rate carriage also located below the platen glass and movable in association with the full rate carriage, a harness for feeding electricity to the light source, and a machine frame for accommodating substantially all elements of the apparatus. The machine frame has a depth in a main scanning direction of the scanner. The light from the light source is reflected by the document, and introduced to a photoelectric converter such as CCD. Thus, the light defines an optical path from the light source to the photoelectric converter below the platen glass. The full and half rate carriages are movable in the sub-scanning or width direction of the machine frame. In the invention, the harness extends within an area defined by the movable zone of the full and half rate carriages, and is guided not to obstruct the optical path of the light. Therefore, a space is not needed behind a scanner frame in the main scanning direction, and the machine frame depth can be reduced.

The image scanning apparatus may further include a turn element, and the harness may extend to the turn element from the full rate carriage such that its direction is turned 180 degrees downward. After the turn element, the harness extends toward a power supply mounted on the machine frame. This turn element may be a harness guide attached to the half rate carriage.

The turn element may be located below the optical path between a first mirror mounted on the full rate carriage and a second mirror mounted on the half rate carriage. The light reflected from the document is incident on the first and second mirrors in turn.

Two pairs of rail may extend along front and rear faces of the machine frame in the sub-scanning direction such that the full rate carriage moves on the first pair of rails and the half rate carriage is moves on the second pairs of rails. In this case, the above-mentioned scanner frame may be defined by the first and second pairs of rails, and the machine frame substantially may overlap the scanner frame if viewed from above. The harness may extend within the first (or second) pair of rails if viewed from above. More specifically, the harness may extend along the rear face of the machine frame, and the optical path may be defined inward of the harness. Mirrors of the full and half rate carriages may cause the optical path to converge inside the machine frame.

DETAILED DESCRIPTION OF THE INVENTION

Embodiments of the present invention will now be described with reference to the accompanying drawings.

Figure 1:
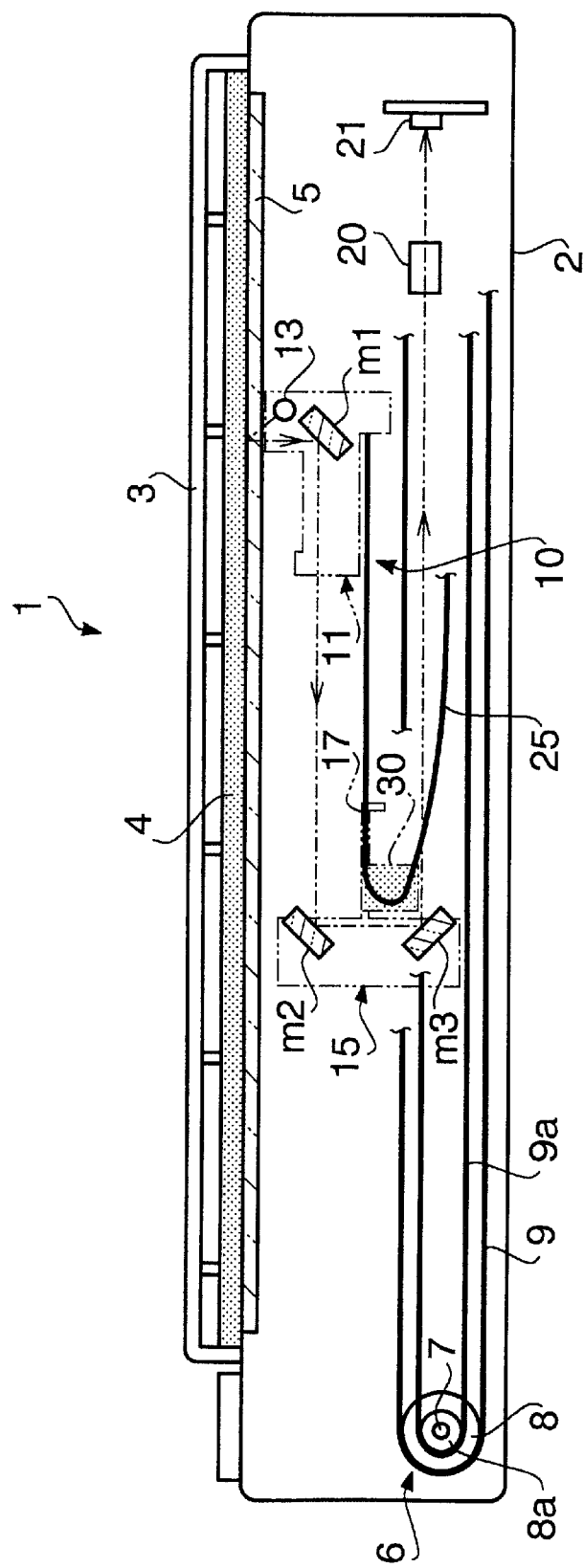
FIG. 1 illustrates a lateral view of an inside structure of an image scanning apparatus according to the present invention.

Referring to FIG. 1, illustrated is an image scanning apparatus 1 according to the present invention, which may be combined with a photocopier or facsimile machine, or used as a scanner for a personal computer. It should be noted that similar reference numerals are used in FIGS. 1 to 6 and FIG. 7 for easier understanding of the invention. The image scanning apparatus 1 includes a machine frame 2, platen (glass) 5 extending horizontally at the top of the machine frame 2, and a scanner 10 that can reciprocate below the platen 5 in a sub-scanning direction inside the machine frame 2. A document D (FIG. 2) placed on the platen 5 is scanned by the scanner 10. Over the document D, laid is a resilient member 4 of a platen cover 3 for pressing the document D against the platen 5.

Figure 3:
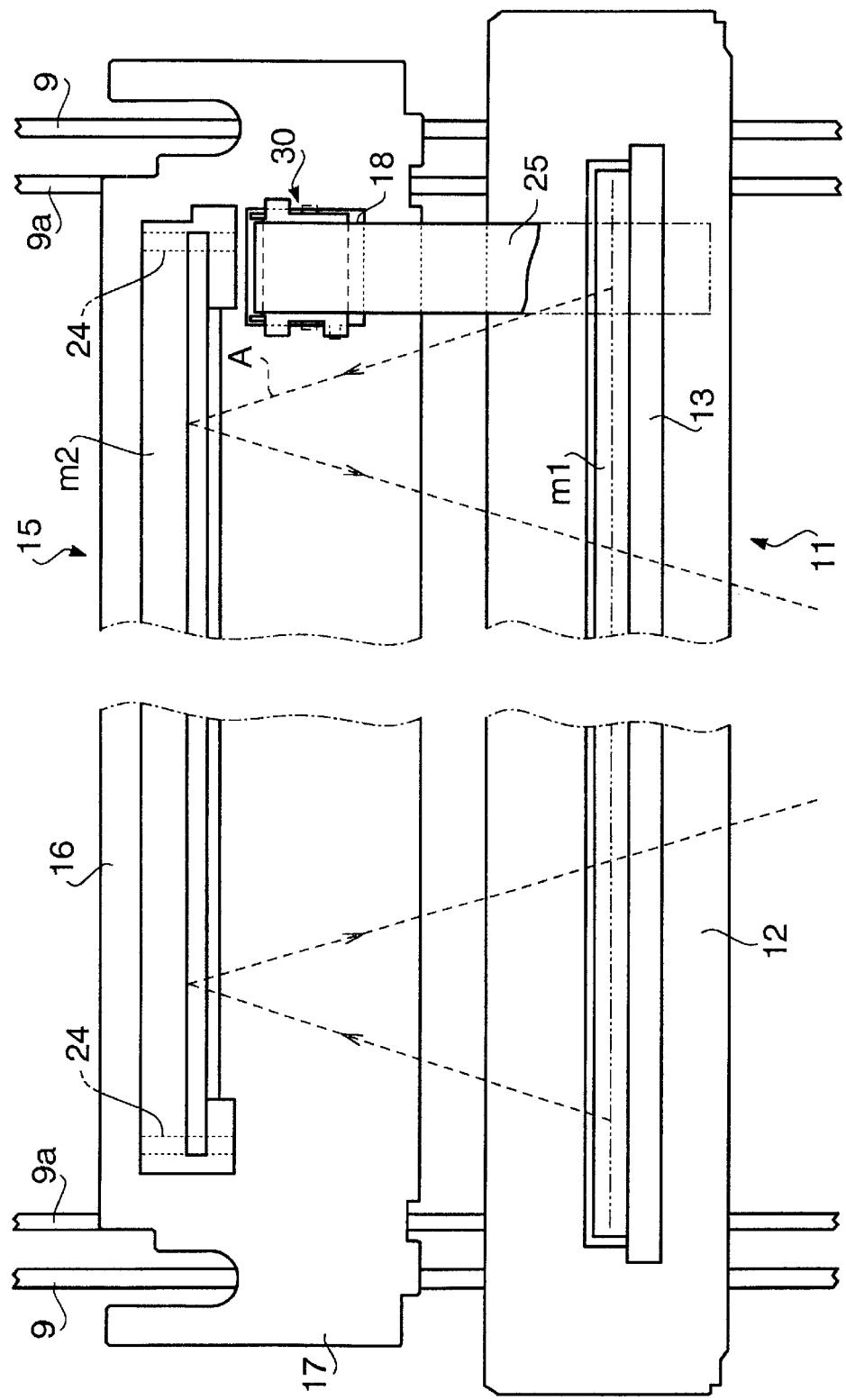
FIG. 3 illustrates a plan view of FIG. 2.

Like a conventional scanner, the scanner 10 includes a full rate carriage 11 having a lamp 13 and mirror m1, and a half rate carriage 15 having second and third mirrors m2 and m3. A drive unit for these two carriages 11 and 15 includes a drive shaft 7, two pairs of pulleys 8 and 8a (only one pair is illustrated) mounted on the drive shaft, and two pairs of belts 9 and 9a (only one pair is illustrated) engaging over the pulleys 8 and 8a respectively. The carriages 11 and 15 are secured on the belts 9 and 9a so that they can move in a sub-scanning direction respectively. As shown in FIG. 3, the carriages 11 and 15 span the two pairs of belts 9 and 9a.

A diameter ratio of the larger pulley 8 to the smaller pulley 8a is set to 2 to 1 in this embodiment, so that the half rate carriage 15 moves at a speed as half as the full rate carriage 11.

The full rate carriage 11 moves at a constant speed in a length direction of the document D and the half rate carriage 15 moves at the half speed of the full rate carriage 11. These carriages 11 and 15 are associated with each other and caused to move reciprocally while radiating a light from the lamp 13 onto the document D on the platen 5. The reflected light from the document D is guided to a lens 20 by the first, second and third mirrors m1, m2 and m3 on the first and second carriages 11 and 15, and then passed to CCD 21. In CCD, light information is transformed to electric signal (digital signal), and the electric signal is output to a suitable device (not shown).

The image information obtained from CCD 21 in the form of digital signal can be used as facsimile signal. If the image scanning apparatus 1 is utilized with a photocopier or a photocopier-fax hybrid machine, the image information may be transmitted to a printer and printed on a recording sheet. If the image scanning apparatus 1 is utilized with a computer, the image information may be combined with other information such as words and sentences.

Figure 2:
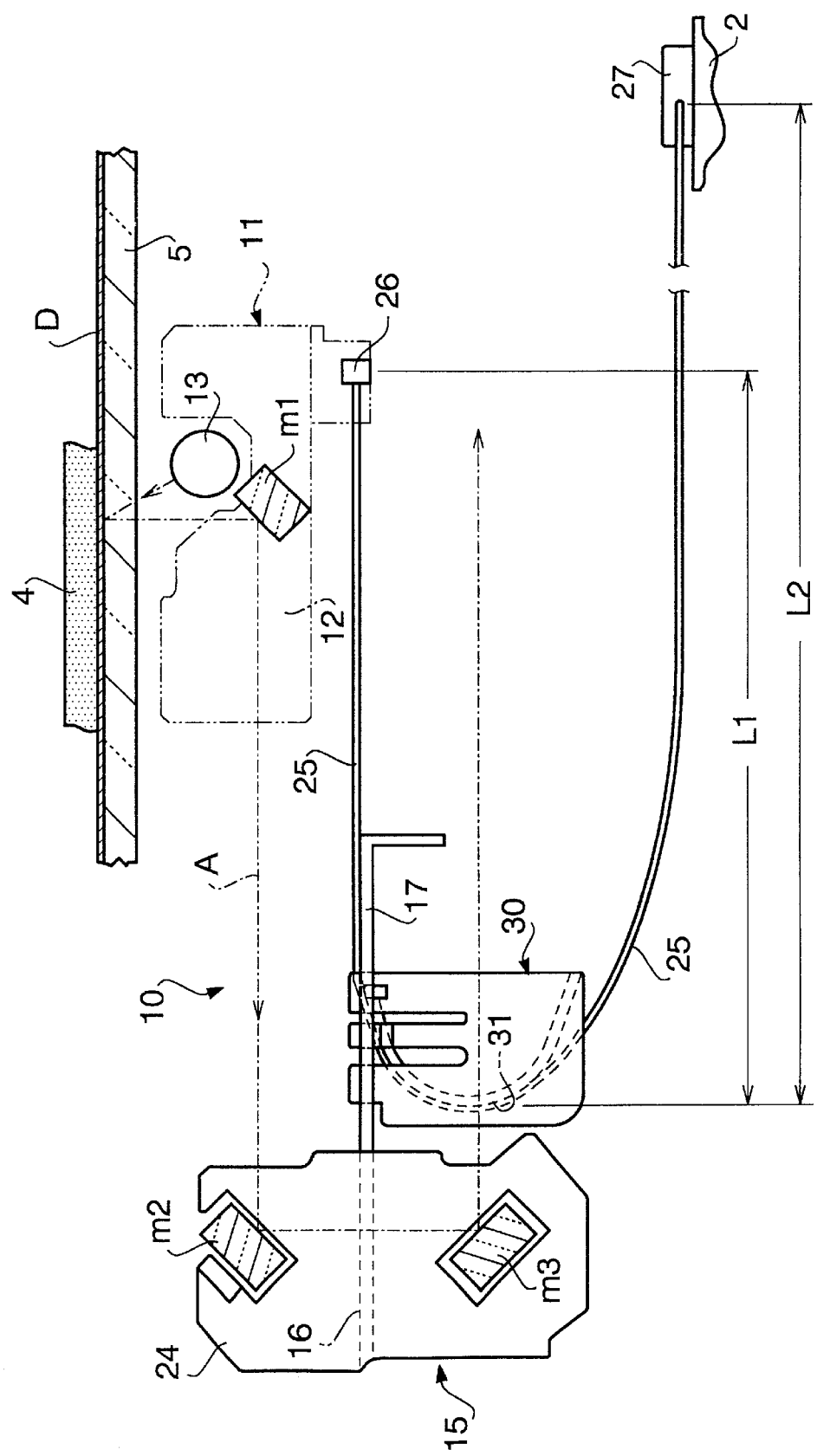
FIG. 2 is an enlarged lateral view of the apparatus show in FIG. 1, particularly depicting relationship between two carriages.

Referring to FIG. 2, the full rate carriage 11 locates the lamp 13 at a desired position on a transverse frame 12 to radiate the document D on the platen 5. The mirror m1 on the full rate carriage 11 is positioned to reflect the light 90 degrees as indicated by the arrow A. The mirrors m2 and m3 on the half rate carriage 15 are also positioned to reflect the light 90 degrees respectively as indicated by the single dot line A. The reflected light is then input to the lens 20. As illustrated in FIG. 3, the path of the light is gradually narrowed from the mirror m1 toward the lens 20 when viewed from the top. The light passing through the lens 20 is received at the photoelectric transfer element of CCD 21.

Voltage of about 1.5 kV is fed to the lamp 13 through a harness 25. The harness 25 is a flat tape-like wire. Specifically, the harness 25 is comprised of conductive element interposed between plastic films such as thin polyimide films. The harness 25 has a fixture 26 at one end which is secured onto the full rate carriage 11 as shown in FIG. 2. The harness 25 extends toward the half rate carriage 15 from the full rate carriage 11 and folds backward such that the other end of the harness 25 is received in a receptacle 27 of the frame 2. An intermediate point of the harness 25 is supported by a harness guide 30 mounted on the half rate carriage 15. Thus, the harness 25 extends like a turned "J" in FIG. 2. Since high voltage flows in the harness 25 and a frame 16 of the half rate carriage 15 is made from metal, the harness guide 30 is made from a plastic material having high insulation property such as polypropylene to prevent electricity leakage. The harness 25 passes such insulated element and does not directly contact the metallic portion of the frame 16.

If the distance between the fixture 26 of the full rate carriage 11 and the half rate carriage 15 is expressed L1, and the distance between the half rate carriage 15 and the fixture 27 on the machine frame 2 is expressed L2, the sum of L1 and L2 is constant. Therefore, the total length of the harness 25 is determined such that the harness 25 can smoothly slide along a guiding surface 31 of the guide member 30. Thus, no excessive tension is applied to the harness 25, and the harness path is maintained to constant. The guiding surface 31 has a "C" shape in the drawing.

The harness 25 is elongated inside the machine frame 2 such that it does not obstruct a light path A. In this embodiment, the harness 25 extends within an area defined by a movable zone of the full and half rate carriages 11 and 15 or within a scanner frame. Specifically, it extends close to a rear face of the machine frame 2. In FIG. 2, the harness 25 lies below and substantially in parallel to the optical path A between the first and second mirrors m1 and m2 so that it does not interfere with the optical path A between the first and second mirrors. In FIG. 3, the harness 25 extends along the right inner belt 9a and close to right rails (not shown) that support the right end portions of the carriages 11 and 15. Left rails (not shown) are also provided along the left inner belt 9a, and these rails (or belts 9) substantially define the scanner frame in a plan view. It should be noted that the belts 9 and 9a extend in the sub-scanning direction.

The half rate carriage 15 has a bracket 24 for supporting the mirrors m2 and m3 from a frame 16. The harness guide 30 fits in an opening 18 formed in a horizontal portion of the frame 16.

Figure 4:
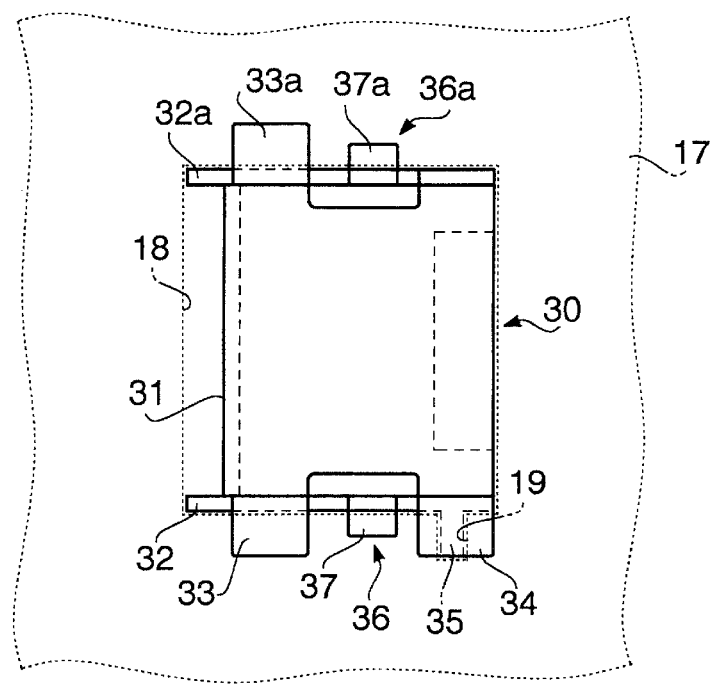
FIG. 4 illustrates a plan view of a harness guide.
Figure 5:
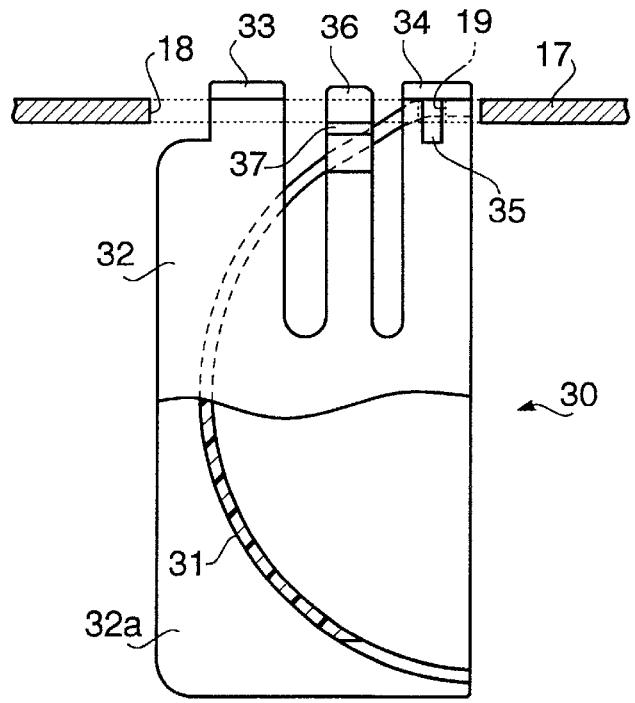
FIG. 5 illustrates a lateral view of the harness guide.
Figure 6:
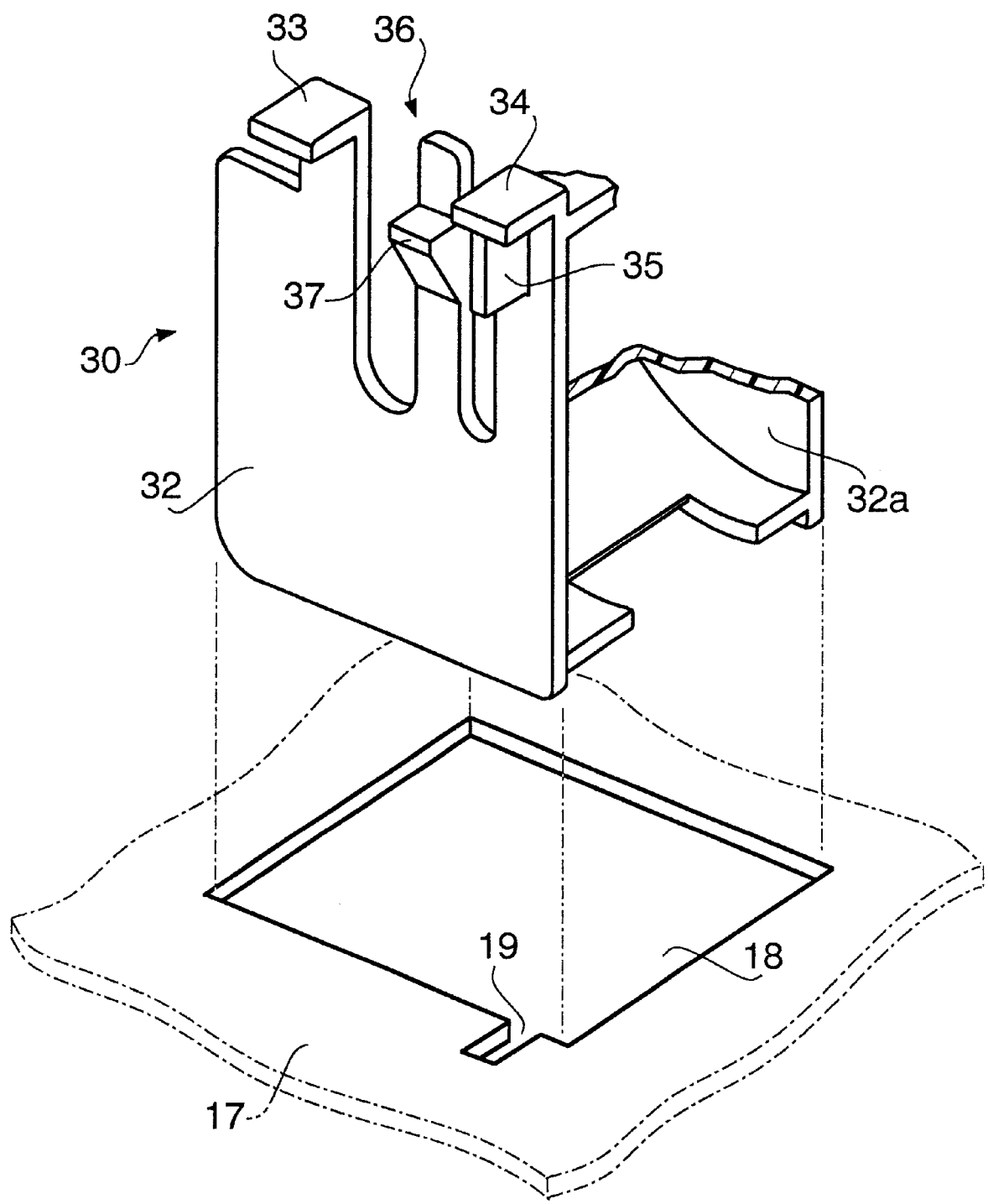
FIG. 6 illustrates a perspective view of the harness guide together with a mating opening.
Figure 7:
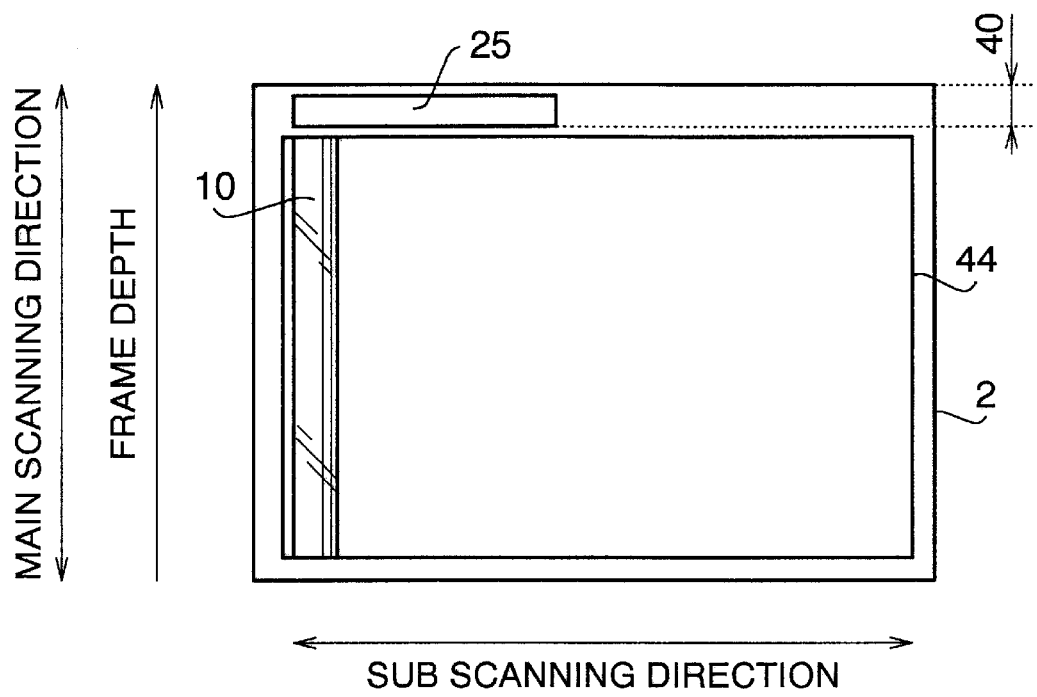
FIG. 7 schematically illustrates a plan view of a conventional arrangement.

The detail of the harness guide 30 is illustrated in FIGS. 4 to 6. The harness guide 30 includes two lateral plates 32 and 32a and the guide member 31 spanning these plates. These elements are integrated and made from a plastic material having insulating property such as polyethylene and polypropylene. The lateral plates 32 and 32a have horizontally bent tongues 33, 33a, 34, vertical extension 35 (FIG. 6), and claws 36, 36a. They are used to hold the guide member 31 in the opening 18 of the horizontal segment 17 of the frame 16. The horizontal tongues 33 and 34 extend laterally outward from the lateral plate 32 and lie over the edge of the opening 18, and the horizontal tongue 33a extends from the opposite plate 32a and lies over the opposite edge of the opening 18.

The claw or finger 36 is created between the tongues 33 and 34 of the plate 32 and the opposite finger 36a is provided on the opposite plate 32a. Each of the fingers 36 and 36a is defined by two parallel slits cut vertically to a predetermined depth in the plate 32/32a as shown in FIGS. 5 and 6. Each finger 36/36a also has a projection 37/37a that hooks the undersurface of the edge of the opening 18 thereby preventing upward movement of the harness guide 30. The extension 35 extends vertically downward from the tongue 34 as best illustrated in FIG. 6, and fits in a cutout 19, which is formed in the horizontal frame 17 and continuous to the opening 18. This restricts horizontal movement of the harness guide 30.

As understood from the foregoing, particularly from FIG. 6, the harness guide 30 is installed into the opening 18 of the frame 16 of the half rate carriage 15 from the above. The various hooks 33, 33a, 34, 37 and 37a near the upper edge of the lateral walls 32 and 32a of the harness guide 30 then clamp the horizontal plate 17. In addition, the key 35 fits in the cutout 19. Thus, the harness guide 30 is firmly positioned on the half rate carriage 15. Accordingly, the harness 25 is guided by the guide member 30 in a desired manner, and sliding movement of the harness 25 does not move the guide member 30.

Referring back to FIG. 2, as the full and half rate carriages 11 and 15 move, the harness 25 slides on the round guide member 31 of the harness guide 30. It is therefore desired to reduce friction between the harness 25 and guide member 31. In the illustrated embodiment, however, the harness 25 is made from a film of polyimide resin, and the harness guide 30 is made from a material having a small friction coefficient such as polypropylene. Therefore, the sliding resistance of the harness 25 to the harness guide 30 can be set to small. It should be noted that the thin insulating coating of the harness 25 may be insufficient to high voltage, and electricity might leak to the metallic frame of the half rate carriage 15. In this embodiment, since the harness guide 30 is made from an insulating material, and the harness 25 contacts the harness guide 30 only, leakage of high voltage is prevented.

The present invention is not limited to the illustrated embodiment. For example, the way of securing the harness guide 30 may be changed in accordance with the structure of the frame 16, and the material of the harness guide 30 may be changed with the width and/or the insulating coat of the harness 25.

The above described and illustrated image scanning apparatus is disclosed in Japanese Patent Application No. 11-311829 filed in JPO on Nov. 2, 1999, and the subject application claims the priority of these Japanese Patent Application, the entire disclosure of which is incorporated herein by reference.

What is claimed is:

1. An image scanning apparatus comprising:
    a platen glass on which a document to be scanned is loaded;
    a scanner movable below the platen glass for scanning the document, the scanner including a full rate carriage, a light source mounted on the full rate carriage for emitting a light to the document on the platen glass, and a half rate carriage;
    a harness for feeding electricity to the light source;
    a machine frame for accommodating substantially all elements of the apparatus and supporting the scanner such that the scanner can move in a sub-scanning, the harness extending below an optical path, the optical oath extending between a first mirror and a second mirror, and in an area defined by a moveable zone of the scanner and in a way not to obstruct the optical path of the light emitted from the light source and reflected by the document toward a photoelectric converter via the full and half rate carriages; and
    a turn element attached between the full rate carriage and the half rate carriage for guiding the harness downward, wherein the harness is arranged below the optical path and extended from the turn element to a fixture of the full rate carriage.

2. The image scanning apparatus of claim 1 wherein the harness is connected to a power supply mounted on the machine frame.

3. The image scanning apparatus of claim 2, wherein the turn element is located below the optical path from the full rate carriage to the half rate carriage.

4. The image scanning apparatus of claim 3, wherein the turn element includes a C-shaped guide member, along which the harness extends, and engagement elements for securing the turn element onto the half rate carriage.

5. The image scanning apparatus of claim 3, wherein the full and half rate carriages are arranged such that the optical path converges.

6. The image scanning apparatus of claim 3 further including a scanner frame in which the scanner can move, and wherein the harness extends in the scanner frame.

7. The image scanning apparatus of claim 2, wherein the turn element includes a C-shaped guide member, along which the harness extends, and engagement elements for securing the turn element onto the half rate carriage.

8. The image scanning apparatus of claim 7, wherein the turn element is made from an insulating material.

9. The image scanning apparatus of claim 7, wherein a surface of the guide member has a small friction coefficient.

10. The image scanning apparatus of claim 9, wherein the harness is made from a polyimide resin.

11. The image scanning apparatus of claim 1, wherein the machine frame has a pair of rails for supporting the half rate carriage such that the half rate carriage can move in the sub-scanning direction, and the harness extends between the pair of rails if viewed from above.

12. The image scanning apparatus of claim 11, wherein the harness extends below the optical path from the full rate carriage to the half rate carriage, and the harness is supported by the full and half rate carriages at end portions of the full and half rate carriages.

13. The image scanning apparatus of claim 1, wherein the harness extends below the optical path from the full rate carriage to the half rate carriage, and the harness is supported by the full and half rate carriages at end portions of the full and half rate carriages.

14. The image scanning apparatus of claim 1, wherein the turn element is made from an insulating material.

15. The image scanning apparatus of claim 1, wherein the turn element includes a C-shaped guide member, along which the harness extends and is turned about 180 degrees, and engagement elements for securing the turn element onto the half rate carriage.

16. The image scanning apparatus of claim 1, wherein a surface of the guide member has a small friction coefficient.

17. The image scanning apparatus of claim 1, wherein the full and half rate carriages are arranged such that the optical path converges.

18. The image scanning apparatus of claim 1 further including a scanner frame in which the scanner can move, and wherein the harness extends in the scanner frame.

19. The image scanning apparatus of claim 1, wherein the machine frame has a pair of rails for supporting the full rate carriage such that the full rate carriage can move in the sub-scanning direction, and the harness extends between the pair of rails if viewed from above.

20. The image scanning apparatus of claim 19, wherein the harness extends below the optical path from the full rate carriage to the half rate carriage, and the harness is supported by the full and half rate carriages at end portions of the full and half rate carriages.

* * * * *